(No Model.)

J. CUMMINGS.
THILL COUPLING.

No. 435,733. Patented Sept. 2, 1890.

Witnesses
Luther E. Pierce
George W. Shook

Inventor
John Cummings.
By his Attorneys
Moulton & Rogers.

UNITED STATES PATENT OFFICE.

JOHN CUMMINGS, OF GRAND RAPIDS, MICHIGAN.

THILL-COUPLING.

SPECIFICATION forming part of Letters Patent No. 435,733, dated September 2, 1890.

Application filed March 7, 1890. Serial No. 343,078. (No model.)

*To all whom it may concern:*

Be it known that I, JOHN CUMMINGS, a citizen of the United States, residing at Grand Rapids, in the county of Kent and State of Michigan, have invented certain new and useful Improvements in Anti-Rattling Thill-Couplings; and I do hereby declare the following to be a full, clear, and exact description of the invention, such as will enable others skilled in the art to which it appertains to make and use the same.

My invention relates to an anti-rattling thill-coupling, and has for its object to prevent rattling and provide means for taking up the lost motion due to wear of the parts, that is simple in construction and has other advantages which will appear upon inspection; and it consists in the construction, combination, and arrangements of the parts, as hereinafter described, and more particularly pointed out in the subjoined claim, reference being had to the accompanying drawings, wherein—

Figure 1:
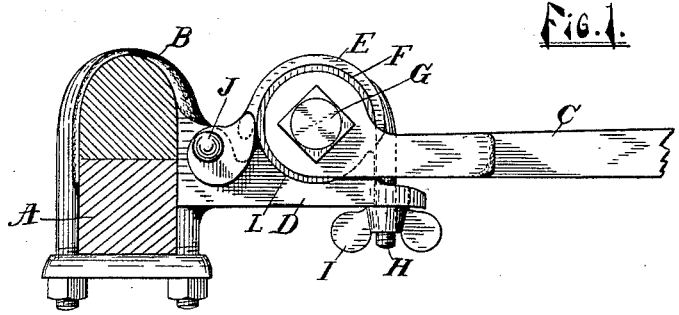
Figure 2:
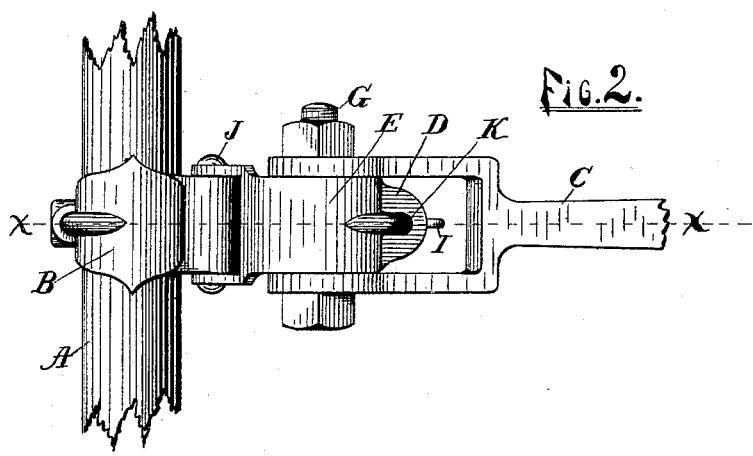
Figure 3:
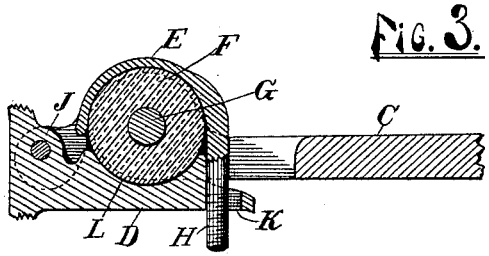

Figure 1 is a side elevation of a device embodying my invention; Fig. 2, a plan view of the same, and Fig. 3 a vertical section on the line $x\ x$ of Fig. 2.

Like letters refers to like parts throughout the drawings.

A represents a fragmentary portion of the axle, and B the clip having integral a forwardly-projecting lug D, provided with a concave seat L, and an oblong opening K near its end. Pivoted to said lug D, by pin J, is a clasp E, prolonged, rounded, and contracted into the threaded stem H, which is adapted to enter the opening K, and is provided with a nut I.

C is the thill-iron inclosing the clasp E between its jaws and provided with ordinary bolt G.

Between the lug D and clasp E in the concave seat L is placed the rubber bushing F, provided with a horizontal aperture for the bolt G. It is evident that as the bushing F wears away it may be tightened in its inclosing-case by tightening the nut I, thus taking up the lost motion. It is also evident that being inclosed in said bushing the bolt G cannot rattle in its bearings; also that the thills may be quickly removed by lifting the clasp E, thus opening the shackle.

I claim—

The combination, with the thill C and bolt G, and clip B, having the integral rigid horizontal lug D, provided with a concave seat L, and an oblong vertical bolt-aperture K forward of the concave seat, of the clasp E, having the integral threaded stem H, adapted to engage the aperture K, the elastic bushing F upon the bolt G, having its exterior surface in contact with the seat L and clasp E, and the nut I upon the stem H, adapted to engage the under side of the lug D, whereby the distance between the thill-bolt G and the clasp E may be adjusted for taking up the lost motion as the surface of the bushing wears away, substantially as set forth.

In testimony whereof I affix my signature in presence of two witnesses.

JOHN CUMMINGS.

Witnesses:
DENNIS L. ROGERS,
GEORGE W. SHOOK.